United States Patent
Torres et al.

(10) Patent No.: US 11,803,576 B1
(45) Date of Patent: Oct. 31, 2023

(54) NETWORK MANAGEMENT PLAN GENERATION AND IMPLEMENTATION

(71) Applicant: Verizon Patent and Licensing Inc., Basking Ridge, NJ (US)

(72) Inventors: Randolph Torres, Clermont, FL (US); Sandeep Juneja, Tampa, FL (US); Corbin Pierce Moline, Merritt Island, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/867,727

(22) Filed: Jul. 19, 2022

(51) Int. Cl.
*G06F 16/29* (2019.01)
*G06F 16/2457* (2019.01)
*G06F 16/28* (2019.01)

(52) U.S. Cl.
CPC ........ *G06F 16/29* (2019.01); *G06F 16/24578* (2019.01); *G06F 16/285* (2019.01)

(58) Field of Classification Search
CPC .... G06F 16/24578; G06F 16/28; G06F 16/29; G06F 18/241; G06F 30/27; G06N 20/00; G06N 5/045
See application file for complete search history.

(56) References Cited

U.S. PATENT DOCUMENTS

| | | | |
|---|---|---|---|
| 10,474,963 B1 * | 11/2019 | Park | G06N 20/00 |
| 2015/0019551 A1 * | 1/2015 | Nanavati | G06F 16/29 |
| | | | 707/737 |
| 2018/0197087 A1 * | 7/2018 | Luo | G06F 16/285 |
| 2020/0004765 A1 * | 1/2020 | Sørensen | G06F 18/214 |
| 2021/0342962 A1 * | 11/2021 | Budlong | G06Q 10/06 |
| 2022/0207163 A1 * | 6/2022 | Gentleman | G06F 21/6218 |
| 2022/0301031 A1 * | 9/2022 | Iyer | G06Q 30/0623 |
| 2022/0301156 A1 * | 9/2022 | Fang | G06N 3/0895 |

FOREIGN PATENT DOCUMENTS

WO   WO-2018005542 A1 *   1/2018   ............ G06F 16/29

* cited by examiner

*Primary Examiner* — Robert W Beausoliel, Jr.
*Assistant Examiner* — Cheryl M Shechtman

(57) ABSTRACT

One or more computing devices, systems, and/or methods for constructing and implementing a network management plan are provided. Baseline classifications are assigned to a set of locations. Sub-locations at the set of locations are evaluated to determine whether to override any of the baseline classifications. A model is used to evaluate images depicting the set of locations to generate predicted classifications for the set of locations. Classifications are assigned to the set of locations by implementing conflict resolution rules to selectively retain or replace baseline classifications with predicted classifications. The classifications are used to construct and/or implement a network management plan.

20 Claims, 9 Drawing Sheets

NETWORK MANAGEMENT PLAN GENERATION AND IMPLEMENTATION

BACKGROUND

A communication network includes various communication equipment used to provide user equipment with communication capabilities over the communication network. The communication equipment could include base stations, repeaters, antennas, 4G/5G fixed wireless access equipment, 5G multi-access edge computing equipment, Ethernet equipment, and/or other wired or wireless equipment. Depending on various attributes of a location and/or an entity to be serviced, certain types of communication equipment may be more suitable and provide improved communication capabilities than other types of communication equipment. The attributes may relate to a residential entity, a public entity, a commercial entity, a shape and construction type of a building at the location, a type of building (e.g., a stadium, a condo unit, a high rise building, a warehouse, etc.), etc. Manually identifying and taking these attributes into account is resource intensive, expensive, and impractical due to the large number of locations that could be serviced (e.g., nationwide service could include hundreds of millions of locations).

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
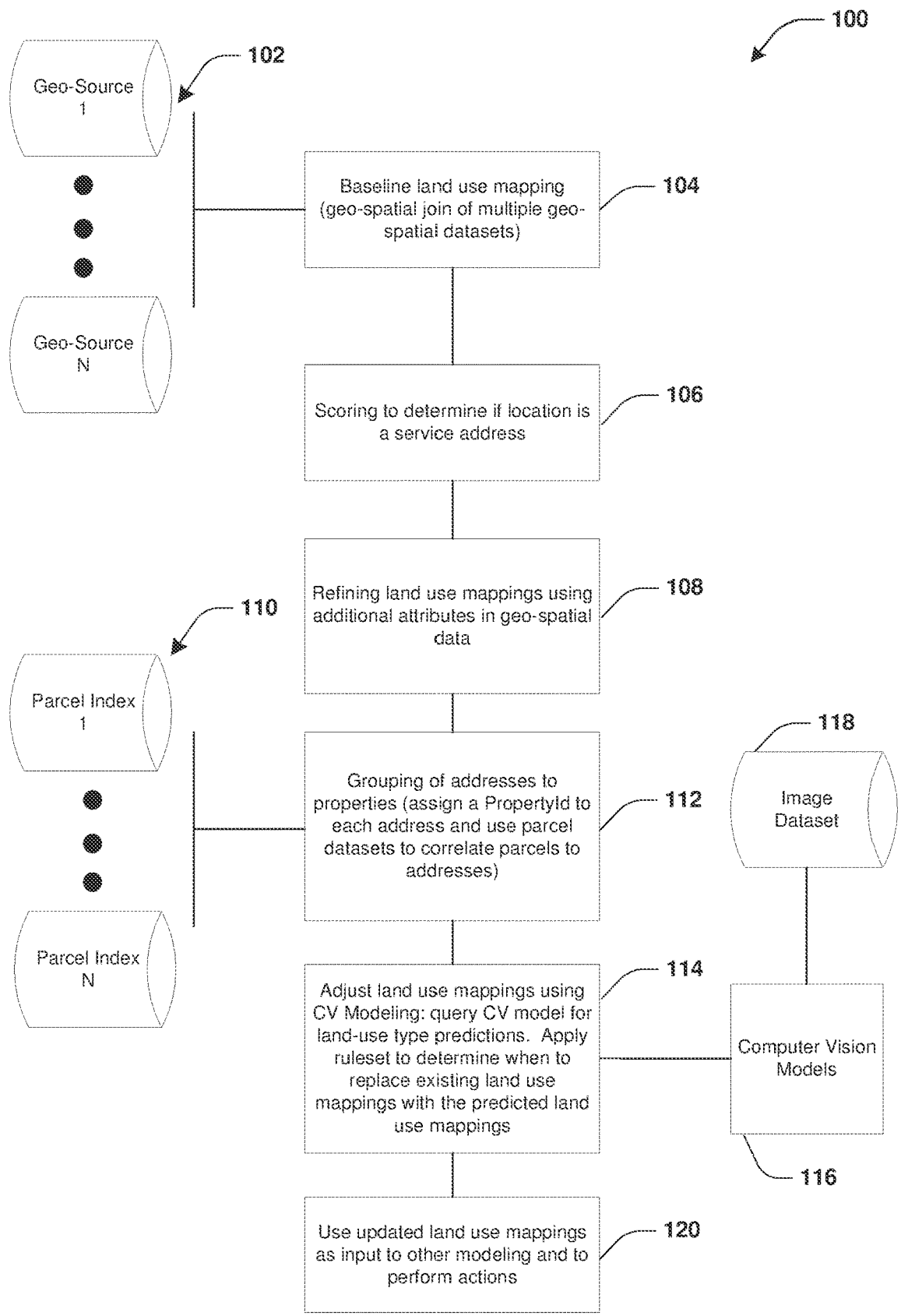
FIG. 1 is a flow chart illustrating an example method for network management plan generation and implementation.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for network management planning are provided. Network planning, and in particular planning associated with deploying and enabling equipment for providing communications services, is a complex and manual process because certain types of equipment will provide better performance than other types of equipment depending on characteristics of the deployment environment. Different types of communication equipment (e.g., 4G, 5G, Ethernet, etc.) may have different characteristics, such as data transfer speeds, frequencies, propagation characteristics such as signal travel distances and the ability to penetrate walls or other structures, reliability, etc. For example, certain communication equipment may utilize frequencies that propagate long distances and are ideal for penetrating and propagating throughout buildings so that communication devices within the buildings can connect to and communicate with this communication equipment. Other types of communication equipment may provide faster broadband communication, but may utilize frequencies that do not propagate as far and do not easily penetrate buildings. Thus, certain types of communication equipment may provide better performance depending on characteristics of the building and location to which the communication equipment is deployed.

Other factors may also play a role into selecting, deploying and enabling certain types of communication equipment to particular locations. For example, a large stadium may benefit from certain types of 5G wireless equipment that would provide patrons, vendors, and/or workers within the stadium with high bandwidth communication capabilities. In contrast, a residential home may not be an appropriate location for installing or making available such 5G wireless equipment due to cost and the small number of occupants that would benefit from the high bandwidth communication capabilities provided by the 5G wireless equipment, and thus a lower cost solution may be more efficient while still providing quality communication capabilities. In this way, certain types of communication equipment may be better suited for different types of locations such as stadiums, condos, high-rise buildings, shopping malls, factories, office buildings, hospitals, small retail shops, single family homes, and/or a variety of buildings and locations. It is impractical to manually identify and evaluate characteristics of buildings (e.g., a large open stadium, a high-rise building with certain types of occupants on different floors, etc.), occupants of the buildings (e.g., a number of occupants or visitors), and entities associated with the buildings (e.g., an owner of a factory site, a commercial strip of retail buildings, a condo complex, etc.) that can be used to select appropriate communication equipment to deploy to such locations. This is because of the shear amount of potential deployment locations and information that would need to be acquired and manually processed (e.g., a service area may include hundreds of thousands of buildings and locations).

Accordingly, as provided herein, a network management plan can be automatically generated and implemented using computer vision modeling and other computer implemented technical processes that are capable of evaluating large datasets of information and images in order to identify and enable certain types of equipment that will provide desired communication performance for various deployment locations.

FIG. 1 illustrates an example of a method 100 for network management plan generation and implementation. In some embodiments, the method 100 is a computer implemented method that is executed by computer hardware, and utilizes various machine learning models (e.g., computer vision) and processes to programmatically construct and/or implement a plan at scale for large service areas associated with large quantities of information that may be impractical for manual evaluation.

Geo-spatial datasets may be extracted from various geo-sources 102. The geo-spatial datasets may comprise parcel attributes such as parcel shapes, geo-coordinates of parcels, parcel land use codes (e.g., residential, conjoined unit, business, multi dwelling unit, single family unit, etc.), identifications of sub-locations of a parcel, etc. During operation 104 of method 100, the geo-spatial datasets may be joined and evaluated to generate baseline land use mappings. A baseline land use mapping may correlate a location and a parcel along with parcel attributes of the parcel, which may be used as a baseline classification assigned to the location (e.g., a location such as a building or address may be assigned a residential parcel land use code assigned to a parcel where the building is located).

During operation 106 of method 100, scoring is performed to determine whether locations within the baseline land use mappings are service addresses for existing services (e.g., utilities services, postal services). A confidence score assigned to a location may correspond to a confidence (e.g., a 0 to 100 scale where 0 is low confidence and 100 is high confidence) as to whether a baseline classification assigned to a location is accurate. In some embodiments, external references for each location are evaluated and a confidence score is assigned based upon a number and type of external references that are indicative of that location having that baseline classification. Certain data sources such as a postal service dataset may provide high accuracy (e.g., a postal service dataset indicating that an address is a business address), while other data sources may be less accurate (e.g., a marketing mailing service dataset may specify that a location is a business location, which could actually be a residential or other type of location). These factors are taken into consideration when assigning scores during confidence scoring.

During operation 108 of method 100, the baseline land use mappings (baseline classifications) are refined using additional attributes in the geo-spatial datasets. For example, a process may be executed to identify locations with confidence scores exceeding a threshold (e.g., confidence scores of 70% or greater) and corresponding baseline classifications derived from parcel land use codes. For a particular address (parcel), a number of sub-locations (units) of the address and a distribution of the sub-locations between different classifications (e.g., residential vs business) are used to determine whether the baseline classification for the address should be retained or overridden. For example, if a baseline classification is based on a parcel land use code of a fixed single-family unit but the address has 4 or more sub-locations that were identified at a high confidence (e.g., a confidence score of 70% or more), then the baseline classification is refined to be a multi-dwelling unit. Furthermore, if the address has more business units than residential units, then the baseline classification may be refined to be business.

During operation 112 of method 100, addresses of properties are grouped together, and property identifiers are assigned to each property and to addresses (sub-locations) grouped with each property. Thus, a property and addresses (sub-locations) grouped with that property are assigned the same property identifier. In some embodiments, parcel datasets 110 are used to correlate parcels (properties) to addresses. In some embodiments, locations are combined to parcel mappings with building shape data to create a mapping between location, building, and parcels. If a building intersects with multiple parcels, then those parcels are grouped together as a group. A reverse lookup using a parcel is performed to identify locations that belong to the parcel in order to form a group of addresses belonging to the same group, and are thus assigned the same property identifier. This information may be combined with attribute data such as property management company details. A mapping table is maintained between address and property in order to provide the ability to associate and disassociate addresses to properties. In this way, a mapping between addresses and property identifiers is generated. In some embodiments, property identifier assignment may be maintained/persisted for subsequent utilization such as during the processing of a new dataset of parcels that does not include the property identifiers.

During operation 114 of method 100, computer vision models 116 are used to evaluate image datasets 118 of images depicting locations, buildings, parcels, etc. The computer vision models 116 can be queried for land use type predictions that can be used to adjust land use mappings (baseline classifications). In particular, a computer vision model may have been trained to evaluate images of locations, buildings, and parcels in order to determine whether the images depict a business, a condo, an airport, a stand-alone retail store, a single family home, a hospital, a stadium, a medical facility, an arena, a high-rise building, an outdoor shopping plaza, and/or a variety of other types of building classifications. Thus, an image from the image dataset 118 may be processed by the computer vision models 116 in order to classify a building depicted by the image based upon various attributes such as a shape of the building, text (e.g., a sign "manufacturing entrance", a name of a business, etc.), surrounding structures, and/or a wide variety of features and attributes of the image. A ruleset may be applied to determine when to replace an existing land use mapping (e.g., replace or override a baseline classification) with a predicted land use mapping generated by the computer vision models 116 based upon the image datasets 118. In this way, updated land use mappings may be determined, which may include baseline classifications and/or predicted classification by the computer visions models 116 that were used to override certain baseline classifications.

During operation 120 of method 100, the updated land use mappings are used as input into other modeling and/or are used to perform various actions associated with network management. In some embodiments, the updated land use mappings may be evaluated to identify locations, buildings, occupants, and/or entities (e.g., a property management company of a property, a business located within a building, an entity owning a manufacturing plant, etc.) where certain types of communication equipment could be deployed or to whom the various types of communication equipment could be recommended for use. For example, a recommendation model may determine that a certain type of wireless communication equipment (e.g., a 5G radio with millimeter-wave frequency carriers or a MEC) would provide desired or improved performance at a price point that may be acceptable to a company associated with a manufacturing plant. Accordingly, the wireless communication equipment may be recommended for deployment at or near to the manufacturing plant, or existing equipment may be recommended to be enabled for use by the manufacturing plant. The recommendation model may determine that a different type of communication equipment may provide desired performance at a price point that may be acceptable to a fixed single-family residence. Thus, the communication equipment may be recommended or deployed at or near to the fixed single-family residence. The recommendation model may be used to determine optimal configuration parameters for already deployed equipment, and thus the optimal configuration parameters may be transmitted as a configuration command over a communication network to the deployed equipment to re-configure the deployed equipment for improved performance (e.g., re-configuration of a frequency setting, a power setting, a beamforming management parameter, and a wide variety of other operating parameters).

Figure 2:
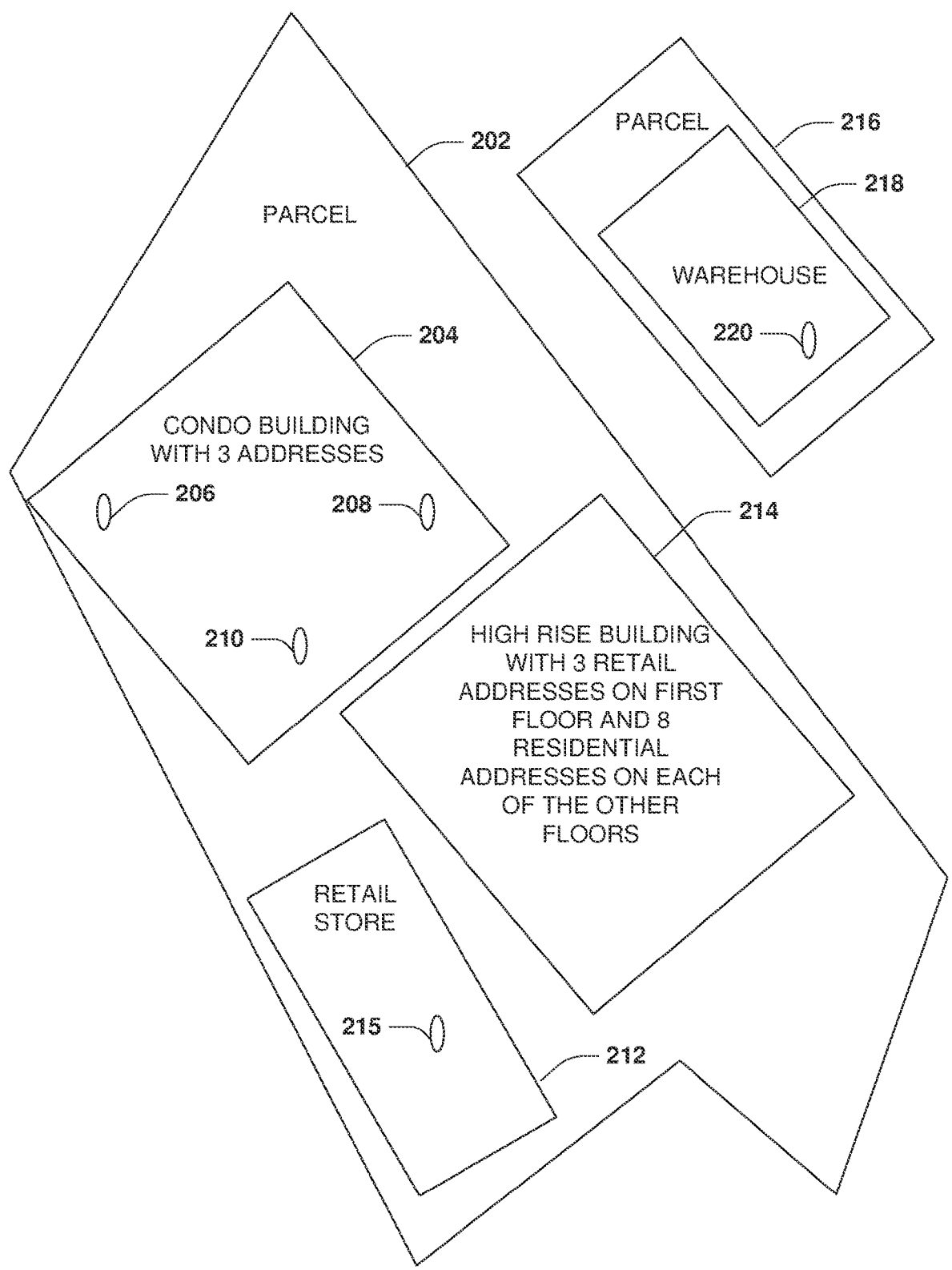
FIG. 2 is a diagram illustrating examples of addresses, buildings, and parcels.

FIG. 2 illustrates parcels within which various buildings and addresses are located. One or more buildings may be situated on a parcel (a property or location), and one or more addresses may be located at the parcel (e.g., each unit/sub-location of a condo building on the parcel may have an address). There may be a parcel:building:address relationship, and addresses and parcels may be linked to buildings. A warehouse building 218 may be located at a parcel 216. The warehouse building 218 may have an address 220. A land use code of the parcel 216 (e.g., a commercial property) may be mapped to the warehouse building 218 and/or the address 220 as a baseline classification. A property identifier of the parcel 216 may be assigned to the warehouse building 218 and/or the address 220.

A condo building 204, a high rise building 214, and a retail store 212 may be located at a parcel 202. The condo building 204 may have a first address 206 associated with a first unit (sub-location) of the condo building 204, a second address 208 associated with a second unit of the condo building 204, and a third address 210 associated with a third unit of the condo building 204. A land use code of the parcel 202 may be mapped to the condo building 204 and/or the addresses of the condo building 204 as a baseline classification. A property identifier of the parcel 202 may be assigned to the condo building 204 and/or the addresses of the condo building 204. The retail store 212 may be associated with an address 215. The land use code of the parcel 202 may be mapped to the retail store 212 and/or the address 215 of the retail store 212 as a baseline classification. The property identifier of the parcel 202 may be assigned to the retail store 212 and/or the address 215 of the retail store 212. Additionally, a fixed land use code and/or property identifier of the parcel 202 may be assigned to the high rise building 214 (a fixed high rise building) and addresses of sub-locations within the high rise building 214 (e.g., 3 retail addresses on a first floor and/or 8 residential addresses on each of the other floors). In this way, associations and mappings between buildings, addresses, and/or parcels may be tracked and used to generate and/or implement plans to selectively identify equipment to recommend or deploy to locations, occupants, and/or owners of the locations.

Figure 3:
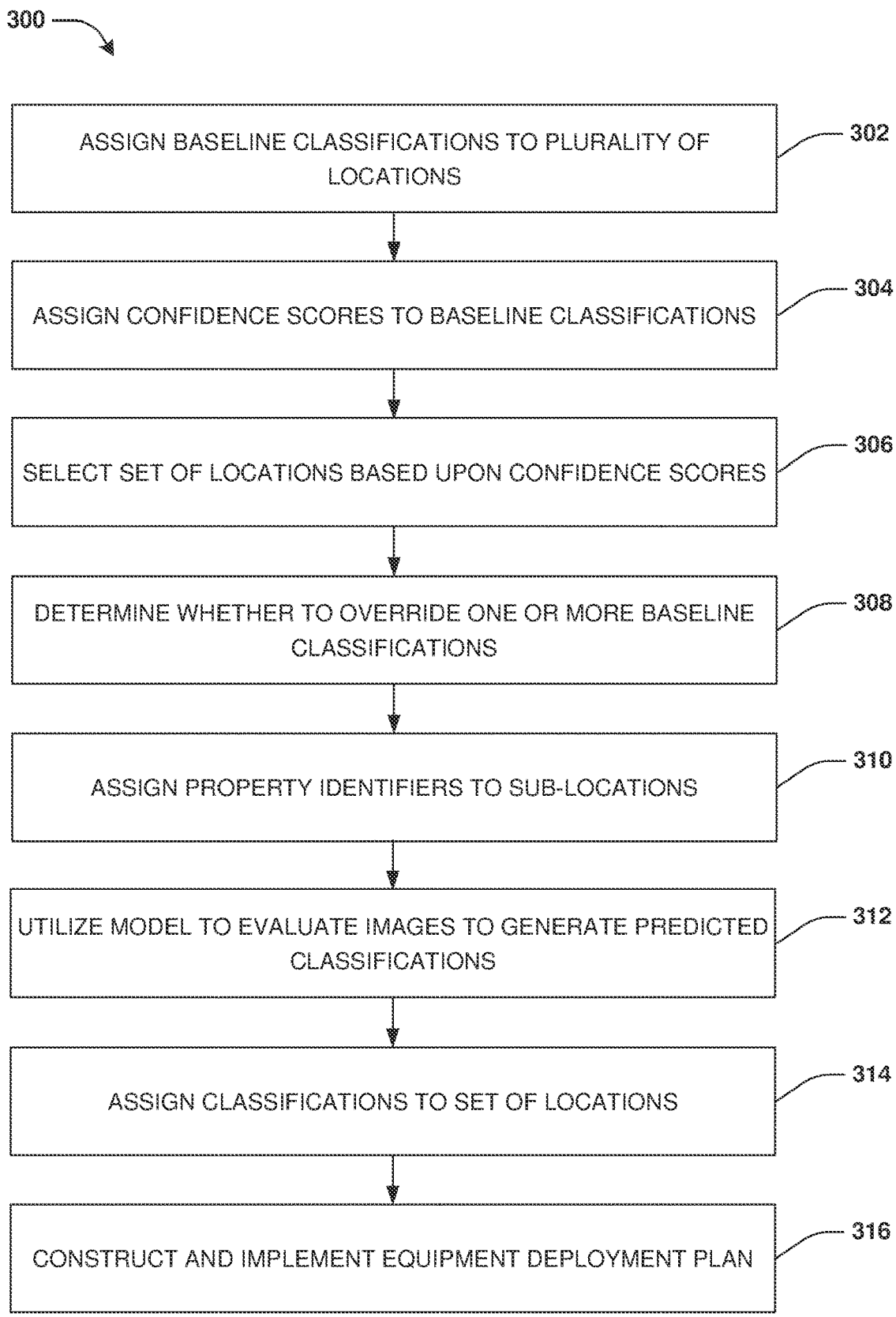
FIG. 3 is a flow chart illustrating an example method for network management plan generation and implementation.
Figure 4:
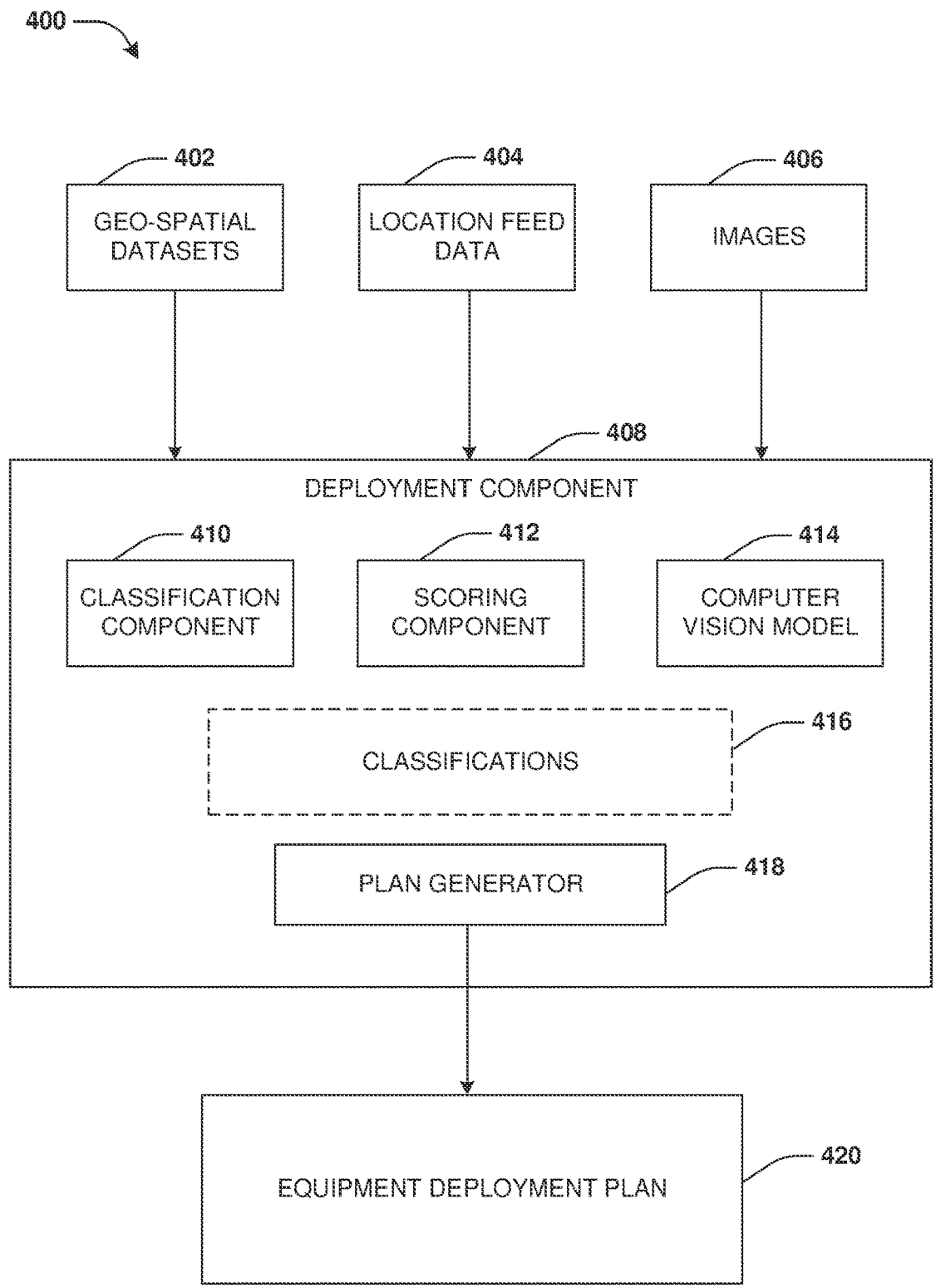
FIG. 4 is a diagram illustrating an example scenario associated with network management plan generation and implementation.

FIG. 3 illustrates an example of a method 300 for network management plan generation and implementation, which is further described in conjunction with system 400 of FIG. 4. In some embodiments, the method 300 may be implemented by a deployment component 408 executing on computer hardware. The deployment component 408 may execute a classification component 410, a scoring component 412, a computer vision model 414, and/or a plan generator 418 utilizing processors, memory, and/or other computing resources.

During operation 302 of method 300, the deployment component 408 may execute the classification component 410 to evaluate geo-spatial datasets 402 in order to assign baseline classifications to a plurality of locations (e.g., millions of locations where communication equipment of a communication network could be deployed). For example, the geo-spatial datasets 402 may include land use codes that can be mapped to locations as the baseline classifications (e.g., a residential land use code of a parcel/location may be mapped to a condo building located at the parcel/location). If a location does not have a baseline classification (e.g., no land use code is specified by the geo-spatial datasets 402), then geo-spatial information for sub-locations associated with an address of the location may be combined to create combined geo-spatial information (e.g., information regarding units within a high-rise building may be combined). The combined geo-spatial information may be evaluated to determine and assign a baseline classification to the location. For example, the information about the units within the fixed high-rise building may be used to assign a baseline classification to the high rise building such as a residential baseline classification based upon the units being identified as residential units.

During operation 304 of method 300, the deployment component 408 may execute the scoring component 412 to evaluate location feed data 404 in order to assign confidence scores to the baseline classifications. A confidence score for a baseline classification assigned to a location may have a value indicative of confidence that the baseline classification is correct/accurate for that location (e.g., a confidence that a residential classification for a building accurately describes the use of the building). The confidence scores may factor into account a data source type (e.g., information from a postal service may be more accurate than information from a marketing mailing list) and correlations between the location feed data 404 and the baseline classifications (e.g., a higher confidence score is assigned when the location feed data 404 corroborates a baseline classification for a location). During operation 306 of method 300, a set of locations is selected by the deployment component 408 from the plurality of locations. The set of locations may be selected to include locations having baseline classifications with confidence scores greater than a threshold (e.g., confidence scores of 70% or greater on a scale from 0% confidence to 100% confidence).

During operation 308 of method 300, the deployment component 408 determines whether to override one or more baseline classifications based upon an override criteria. The override criteria may correspond to a ratio and/or threshold used to evaluate sub-locations at a location in order to determine whether to override a baseline classification assigned to the location. For example, baseline classifications assigned to the sub-locations of the location may be identified (e.g., 5 units within a building are commercial and 25 units within the building are residential). A ratio of sub-locations with different baseline classifications may be identified, such as 1 commercial sub-location to 5 residential sub-locations. If the ratio exceeds a threshold, then the baseline classification assigned to the greater number of sub-locations (residential) will be assigned to the location, which may override a currently assigned baseline classification for the location. It may be appreciated that a variety of other criteria and/or rules may be taken into account, such as where the baseline classification assigned to the most sub-locations is used to override a currently assigned baseline classification. In an example, a land use code (a baseline classification) for a retirement home community may be business. However, a majority of the sub-locations within the retirement home community are residential units, and thus the business baseline classification of business may be overridden with a residential baseline classification. In this way, baseline classifications may be retained or overridden based upon baseline classifications of sub-locations within the set of locations.

Figure 5:
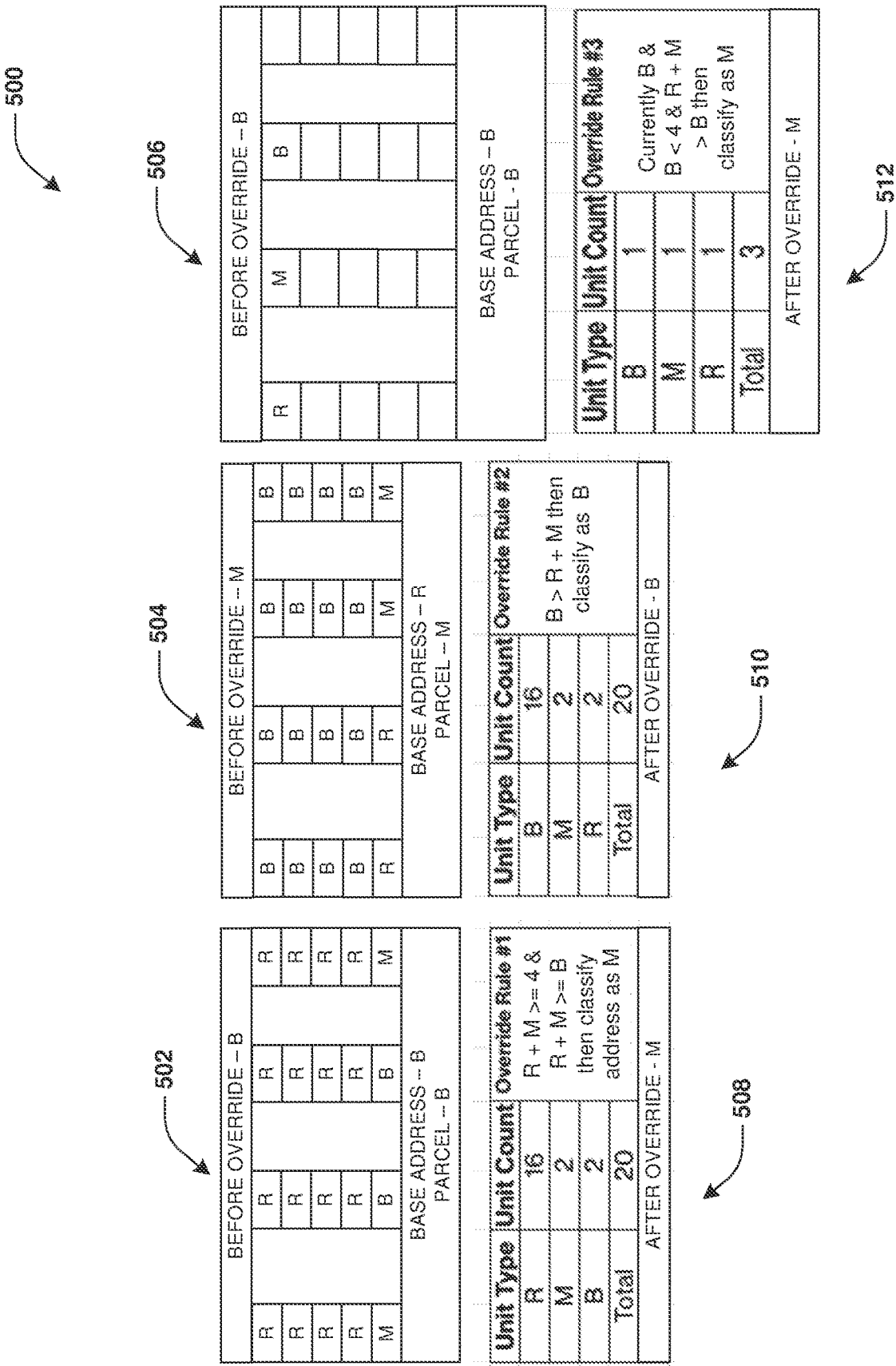
FIG. 5 is a diagram illustrating examples of overriding classifications assigned to locations.

An embodiment of overriding a baseline classification is illustrated by example 500 of FIG. 5. A baseline classification may be (B) for business, (R) for residential, or (M) for a mix of residential and business. A first baseline classification 502 for a first parcel may be set to business. The first parcel may include 16 residential sub-locations, 2 mixed sub-locations, and 2 business sub-locations for a total of 20 sub-locations. A second baseline classification 504 for a second parcel may be set to mixed. The second parcel may include 16 business sub-locations, 2 mixed sub-locations, and 2 residential sub-locations for a total of 20 sub-locations. A third baseline classification 506 for a third parcel may be set to business. The third parcel may include 1 business sub-location, 1 mixed sub-location, and 1 residential sub-location.

A first override rule may be applicable to the first baseline classification 502 for the first parcel to create a first overridden classification 508. The first override rule may specify that the first overridden classification 508 is to be set to mixed if the sum of residential sub-locations (16) and mixed sub-locations (2) is equal to or greater than a threshold (e.g., 4 or some other value) and the if the sum of residential sub-locations (16) and mixed sub-locations (2) is equal to or greater than the number of business sub-locations (2).

A second override rule may be applicable to the second baseline classification 504 for the second parcel to create a second overridden classification 510. The second override rule may specify that the second overridden classification 510 is to be set to business if the number of business sub-locations (16) is greater than the sum of the number of residential sub-locations (2) and the number of mixed sub-locations (2).

A third override rule may be applicable to the third baseline classification 506 for the third parcel to create a third overridden classification 512. The third override rule may specify that the third overridden classification 512 is to be set to mixed if a current baseline classification is set to business, the number of sub-locations is less than a threshold (e.g., less than 4 or some other number), and the sum of the number of residential sub-locations (1) and the number of mixed sub-locations (1) is greater than the number of business sub-locations (1).

Referring back to FIGS. 3 and 4, during operation 310 of method 300, the deployment component 408 may assign property identifiers to sub-locations within the set of locations. For example, a property identifier (e.g., a unique identifier) of a location may be assigned to sub-locations within the location. In this way, sub-locations such as buildings and addresses of a location (a parcel/property) are grouped together and associated with the same property identifier. The property identifier may be used to obtain additional attributes linked to the location (parcel/property) such as a property management entity where a recommendation of equipment can be proposed. The property identifier can be used to identify a number of sub-locations within a location, and thus locations with large numbers of sub-units may be prioritized for equipment deployment or recommendations compared to locations with less sub-units. The property identifier can be used to identify and determine attributes of sub-locations of a location in order to generate intelligent network management plans or recommendations of communication equipment that would provide desired communication capabilities. For example, 5G equipment may be selected for deployment to a location based upon the property identifier linking the location with a stadium, concession stands, parking lots, and/or other sub-locations that would benefit from communication transmission characteristics and capabilities of the 5G equipment compared to other types of equipment. If another location has a property identifier associated with buildings having shapes and structures that are not conducive for 5G signal propagation, then different communication equipment may be recommended. The property identifier can be used to group buildings within a location into a group associated with an entity (e.g., an owner or manager of the buildings). The property identifier can be used to differentiate between different types of entities located within a location, such as a particular retailer in a first retail building, a different retailer in a second retail building, and a public entity owning a parking deck at the location.

During operation 312 of method 300, the deployment component 408 executes a computer vision model 414 or other image based machine learning model to processes images 406 of the locations in order to generate predicted classifications for the locations. The predicted classifications may be derived from attributes generated by the computer vision model 414. The attributes may relate to a sub-classifications relating to more precise and granular classification for a location or sub-location at the location, such as a stadium, a medical facility, a manufacturing facility, a single family home, a condo, an industrial site, an airport, a distribution center, an indoor or outdoor retail location, or any other building or business type. The attributes may also relate to 2-dimensional polygons and/or shape of the building, which may be used to identify the type of building such as a stadium or warehouse and/or whether the structure of the building would be conducive to certain types of communication technology propagation characteristics such as 5G, 4G, or other communication technologies. In this way, the computer vision model 414 may be used to score shapes and perpendicular aspects of a building for assigning a rating to the building. The rating can be used to determine whether to deploy equipment to a location where the building is located.

The attributes may relate to a number of stores or residential units in a building (e.g., a number of sub-locations of a location). The attributes may relate to text tags parsed from an image of the building. The text tags may be evaluated to identify keywords that may be matched to a repository of keywords of businesses, entities, stores, building types, etc. (e.g., a sign "hospital", "order coffee here", "entrance to warehouse", "Business ABC entrance", etc.), and thus can be used to identify a predicted classification for the building. In this way, the computer vision model 414 may be utilized to determine a building type of a building at a location based upon text tags parsed from an image of the building. In some embodiments, the computer vision model 414 may be used to determine whether to group terrain and one or more buildings of a location for generating a predicted classification for the location. In some embodiments, the computer vision model 414 may be used to break down an image of a location into pictures around a building, which are evaluated by the computer vision model 414 to identify structures used to assign a classification to the location (e.g., structures indicative of a warehouse, a port, a stadium, a delivery bay, etc.).

In some embodiments, the computer vision model 414 is used to score shapes (e.g., rectangular, circular, polygon, vertices, etc.) and perpendicular aspects of a building in order to provide a rating of success for implementing certain types of communication equipment, such as 5G. The computer vision model 414 is trained to identify a building type of the building. The computer vision model 414 may evaluate terrain and buildings to see if the terrain and buildings are to be grouped together. The computer vision model 414 may identify types of text from or around the building to further determine the building type and an occupant in the building. The computer vision model 414 may evaluate images of surrounding areas to identify other text, bays (e.g., a delivery bay), or anything else to aid in classifying the building. If bays are on both ends of the building and are sized to fit a semi-truck, then the building may be classified as a distribution center. If there are little to no bays but there are car haulers in a parking lot, then the building may be classified as an auto assembly plant. If there is text of the name of a retail store on the building, then the building may be a distribution building if the building has a lot of bays, otherwise, the building may be a retail store. If there are minimal bays and there are no other nearby retailers and minimal parking lots, then the building may be a distribution center.

During operation 314 of method 300, classifications 416 may be assigned to the locations by implementing one or more conflict resolution rules to selectively retain or replace baseline classifications with predicted classifications. If the baseline classification and the predicted classification match, then the baseline classification is retained. If the predicted classification does not match the baseline classification, then the one or more conflict resolution rules are used to determine whether to retain or replace the baseline classification with the predicted classification. In some embodiments, in response to identifying a conflict (mismatch) between a baseline classification for a location and a predicted classification generated by the computer vision model 414 for the location, then a conflict resolution rule is applied to resolve the conflict to select either the baseline classification or the predicted classification as a classification for the location.

In some embodiments, a first conflict resolution rule may be applied in response to a determination that more than one of the geo-spatial datasets specifies the same baseline classification for a location and a determination is made that a business type of a business located at the location is known. The first conflict resolution rule may be used to assign a first rating to a classification for the location (e.g., an 80% rating may be applied). The first rating may be used to determine whether to deploy equipment to the location, such that the higher the rating, the more likely that it would be beneficial to deploy or recommend certain equipment for deployment to the location. In some embodiments, a second conflict resolution rule may be applied in response to a determination that more than one of the geo-spatial datasets specifies the same baseline classification for a location and a customer is located at the location. The second conflict resolution rule may be used to assign a second rating to the classification for the location (e.g., a 90% rating may be applied). The second rating may be used to determine whether to deploy equipment to the location.

In some embodiments, a third conflict resolution rule may be applied in response to a determination that an output of the computer vision model 414 matches the criteria for applying the first conflict resolution rule (e.g., more than one of the geo-spatial datasets specifies the same baseline classification for a location and a determination that a business type of a business located at the location is known) or the second conflict resolution rule (e.g., more than one of the geo-spatial datasets specifies the same baseline classification for a location and a customer is located at the location). If the output of the computer vision model 414 matches the criteria, then the first rating or the second rating may be increased (e.g., 10% may be added to whichever rating was applied to the classification, such as the first rating or the second rating).

In some embodiments, a fourth conflict resolution rule may be applied in response to a determination that the location is determined to be empty by the first conflict resolution rule or the second conflict resolution rule or are in conflict with an output of the computer vision model 414. The fourth conflict resolution rule is executed to utilize the computer vision model 414 to identify a building at the location. Land usage for the building may be determined based upon the computer vision model 414 based upon attributes identified by the computer vision model (e.g., a stadium, a hospital, a distribution center, an arena, etc.). A rating (e.g., 50%) may be applied to a classification derived from the land usage, which is assigned to the location.

In some embodiments, a fifth conflict resolution rule may be applied in conjunction with the fourth conflict resolution rule in response to the computer vision model 414 identifying one or more text tags parsed from images that correspond to one or more entity names (e.g., business names) of an entity name dataset. If a text tag is matched to an entity name that is designated as a prospective entity for deploying communication equipment, then the rating may be increased by a first amount (e.g., increased from 50% to 80%). If the text tag is matched to an entity name that is designated as an entity currently utilizing equipment of the communication network or has an account for using the communication network, then the rating may be increased by a second amount (e.g., increased from 50% to 90%). In this way, the computer vision model 414 may be used to assign classifications 416 to locations and ratings indicative of how beneficial it would be to deploy or recommend deployment of certain types of communication equipment to those locations.

During operation 316 of method 300, the deployment component 408 may execute a plan generator 418 to construct and/or implement a network management plan 420 based upon the classifications 416 and/or ratings assigned to the locations. If a location has a rating that exceeds a threshold (e.g., a rating of 75% or greater), then the location may be included within the network management plan 420. The classification for the location may be used to identify particular types of equipment to include within the network management plan 420 for deployment or to recommend for deployment to the location. For example, a particular type of equipment (e.g., a repeater, an antenna, 4G equipment, 5G equipment, wireless equipment, Ethernet or wired equipment, etc.) may provide desired communication capabilities and performance for the location at a particular cost point. The property identifiers assigned to locations and sub-locations may be used to select what equipment to recommend or deploy and to what entity to recommend or deploy the equipment. In some embodiments, a first type of equipment may be selected and deployed at a first location based upon the first location being a residential location. A second type of equipment may be selected and deployed at a second location based upon the second location being a commercial location. In some embodiments, an entity associated with a location (e.g., a particular owner or business) may be used to select what equipment to deploy or recommend (e.g., recommend commercial grade equipment compared to lower cost or slower equipment more tailored for single family residential homes based upon an occupant/owner being a commercial retailer).

In some embodiments, deployment of equipment may involve assigning the equipment to a technician for installation, dispatching or shipping the equipment to a location, facilitating installation of the equipment by a technician (e.g., displaying instructions on a computer device used by the technician to install the equipment or displaying an installation work order) or robot (e.g., transmitting commands to the robot to control the robot to perform installation), etc. Implementation of the network management plan 420 may be used as a feedback loop to train the computer vision model 414, the plan generator 418, the scoring component 412, and/or the classification component 410. Parameters, weights, functions, rules, and/or criteria may be adjusted based upon whether an entity accepted, rejected, or ignored a recommendation to deploy particular equipment to a location associated with the entity. For example, functions, parameters, etc. used to select particular equipment to recommend to a particular entity may be given a lower weight if the entity rejected a recommendation to utilize that equipment.

In some implementations, the network management plan is compared to existing deployments of network equipment, and where existing equipment is identified, recommendations may be made to enable such equipment for service or recommendations may be made to entities associated with the locations of the benefit of obtain services using the equipment.

Figure 6:
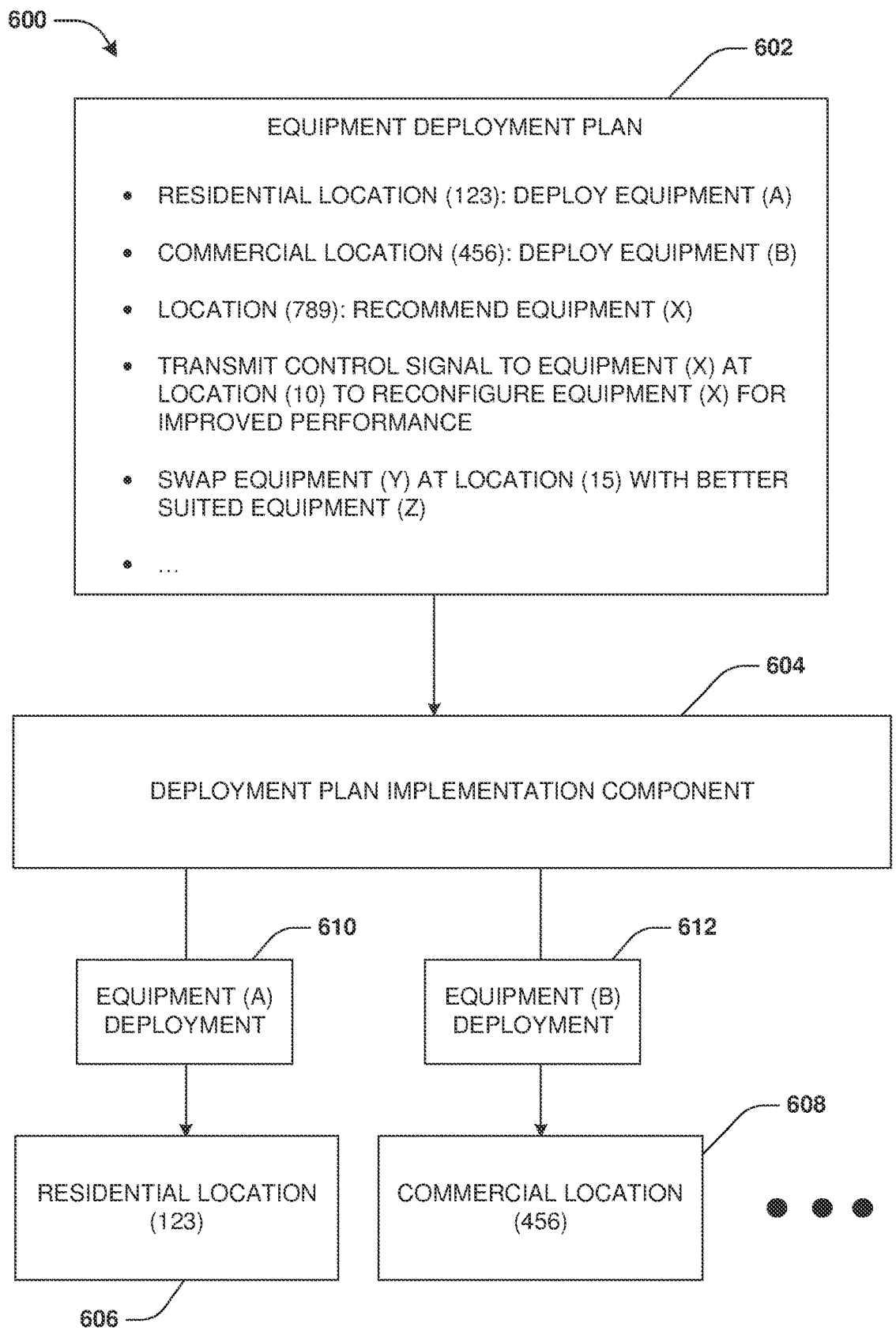
FIG. 6 is a diagram illustrating an example scenario associated with implementing a network management plan generation.

FIG. 6 illustrates an example of a system 600 for implementing a network management plan 602. In some embodiments, the network management plan 602 may include an equipment deployment plan. The network management plan 602 may be constructed to specify that equipment (A) is to be deployed to residential location (123), equipment (B) is to be deployed to commercial location (456), a control signal is to be transmitted to equipment (X) at location (10) to reconfigured equipment (X) for improved performance, that equipment (Y) at location (15) is to be swapped with equipment (Z) that is better suited for location (15), etc. A deployment plan implementation component 604 (e.g., a computer, shipping equipment, transportation equipment, installation equipment, a robot, etc.) may be controlled to implement the network management plan 602 such as to deploy 610 the equipment (A) to the residential location 606 and to deploy 612 the equipment (B) to the commercial location (456) 608.

According to some embodiments, a method may be provided. The method includes evaluating geo-spatial datasets to assign baseline classifications to a plurality of locations. The method includes evaluating location feed data to assign confidence scores to the baseline classifications based upon correlations between the location feed data and the baseline classifications. The method includes selecting a set of locations from the plurality locations based upon the set of locations having baseline classifications with confidence scores greater than a threshold. The method includes evaluating sub-locations at the set of locations to determine whether to override one or more baseline classifications, wherein a first baseline classification assigned to a first location is overridden with a second baseline classification in response to an override criteria being satisfied based upon a number of sub-locations at the first location having the second baseline classification. The method includes assigning property identifiers to the sub-locations, wherein a property identifier of the first location is assigned to sub-locations at the first location. The method includes utilizing a model to evaluate images of the set of locations to generate predicted classifications for the set of locations. The method includes assigning classifications to the set of locations by implementing one or more conflict resolution rules to selectively retain or replace baseline classifications with predicted classifications. The method includes constructing and implementing a network management plan to deploy equipment to one or more locations within the set of locations based upon classifications assigned to the one or more locations and the property identifiers.

According to some embodiments, the method includes in response to determining that a location does not have a baseline classification specified by the geo-spatial datasets, combining geo-spatial information for sub-locations associated with an address of the location. The method includes evaluating the combined geo-spatial information to determine and assign a baseline classification to the location.

According to some embodiments, the method includes in response to a first location being assigned a commercial classification, selecting and deploying a first type of equipment to the first location. The method includes in response to a second location being assigned a residential classification, selecting and deploying a second type of equipment to the second location.

According to some embodiments, the method includes in response to identifying a conflict between a baseline classification for a location and a predicted classification generated by the model for the location, applying the one or more conflict resolution rules to resolve the conflict by selecting either the baseline classification or the predicted classification as a classification for the location.

According to some embodiments, the method includes in response to more than one of the geo-spatial datasets specifying the baseline classification for a location and a determination that a business type of a business located at the location is known, assigning a first rating to a classification for the location, wherein the first rating is used to determine whether to deploy equipment to the location.

According to some embodiments, the method includes in response to more than one of the geo-spatial datasets specifying the baseline classification for the location and a determination that a customer is located at the location, assigning a second rating to the classification, wherein the second rating is higher than the first rating, and wherein the second rating is used to determine whether to deploy equipment to the location.

According to some embodiments, the method includes in response to a determination that a predicted classification output by the model for a location matches a baseline classification for the location, increasing a rating assigned to a classification of the location, wherein the rating is used to determine whether to deploy equipment to the location.

According to some embodiments, the method includes in response to identifying a conflict between a baseline classification for a location and a predicted classification generated by the model for the location, utilize the model to identify a building at the location. The method includes evaluating the building to determine a classification for the location. The method includes assigning a rating to the classification for determining whether to deploy equipment to the location.

According to some embodiments, the method includes adjusting a rating assigned to a classification for a location based upon a correlation between a text tag parsed from an image of the location by the model and a name of a business at the location, wherein the rating is used to determine whether to deploy equipment to the location, and wherein the rating is adjusted by a first value if the business is a prospective business and the rating is adjusted by a second value if the business is a customer.

According to some embodiments, the method includes utilizing the model to generate attributes including a sub-classification relating to at least one of a stadium, a medical facility, a manufacturing facility, a single family home, a condo, an industrial site, an airport, a distribution center, an indoor retail location, an outdoor retail location, or a building type; 2-dimensional building polygons of a building; a number of stores or residential units in the building; a shape of the building; and text tags parsed from an image of the building.

According to some embodiments, the method includes utilizing the model to score shapes and perpendicular aspects of a building for assigning a rating used to determine whether to deploy equipment to a location where the building is located.

According to some embodiments, the method includes utilizing the model to determine whether to group terrain and one or more buildings of a location for generating a predicted classification for the location.

According to some embodiments, the method includes utilizing the model to determine a building type of a building at a location based upon text tags parsed from an image of the building.

According to some embodiments, a computing device is provided. The computing device comprises a memory comprising instructions; and a processor coupled to the memory, the processor configured to execute the instructions to facilitate performance of operations comprising: evaluating geo-spatial datasets to assign baseline classifications to a set of locations; evaluating sub-locations at the set of locations to determine whether to override one or more baseline classifications, wherein a first baseline classification assigned to a first location is overridden with a second baseline classification in response to an override criteria being satisfied based upon a number of sub-locations at the first location having the second baseline classification; utilizing a model to evaluate images of the set of locations to generate predicted classifications for the set of locations; assigning classifications to the set of locations by implementing one or more conflict resolution rules to selectively retain or replace baseline classifications with predicted classifications; and deploying equipment to a location within the set of locations based upon a classification assigned to the location.

According to some embodiments, the operations include utilizing the model to break down an image of the location into pictures around a building to identify structures used to assign the classification to the location.

According to some embodiments, the operations include identifying an entity located within a building at the location; and selecting the equipment to deploy to the location based upon the entity.

According to some embodiments, the operations include implementing a feedback loop based upon whether the classification is correct, wherein the feedback loop is utilized to update the model.

According to some embodiments, a non-transitory computer-readable medium storing instructions that when executed facilitate performance of operations, is provided. The operations include evaluating geo-spatial datasets to assign baseline classifications to a set of locations; evaluating sub-locations at the set of locations to determine whether to override one or more baseline classifications, wherein a first baseline classification assigned to a first location is overridden with a second baseline classification in response to an override criteria being satisfied based upon a number of sub-locations at the first location having the second baseline classification; utilizing a model to evaluate images of the set of locations to generate predicted classifications for the set of locations; assigning classifications to the set of locations by implementing one or more conflict resolution rules to selectively retain or replace baseline classifications with predicted classifications; identifying an entity associated with one or more locations; and generating a network management plan for the entity based upon classifications assigned to the one or more locations and the entity.

According to some embodiments, the operations include grouping buildings within a location into a group associated with the entity.

According to some embodiments, the operations include assigning property identifiers to the sub-locations, wherein a property identifier of the first location is assigned to sub-locations at the first location; and using the property identifier to identify and track the first location and the sub-locations at the first location.

Figure 7:
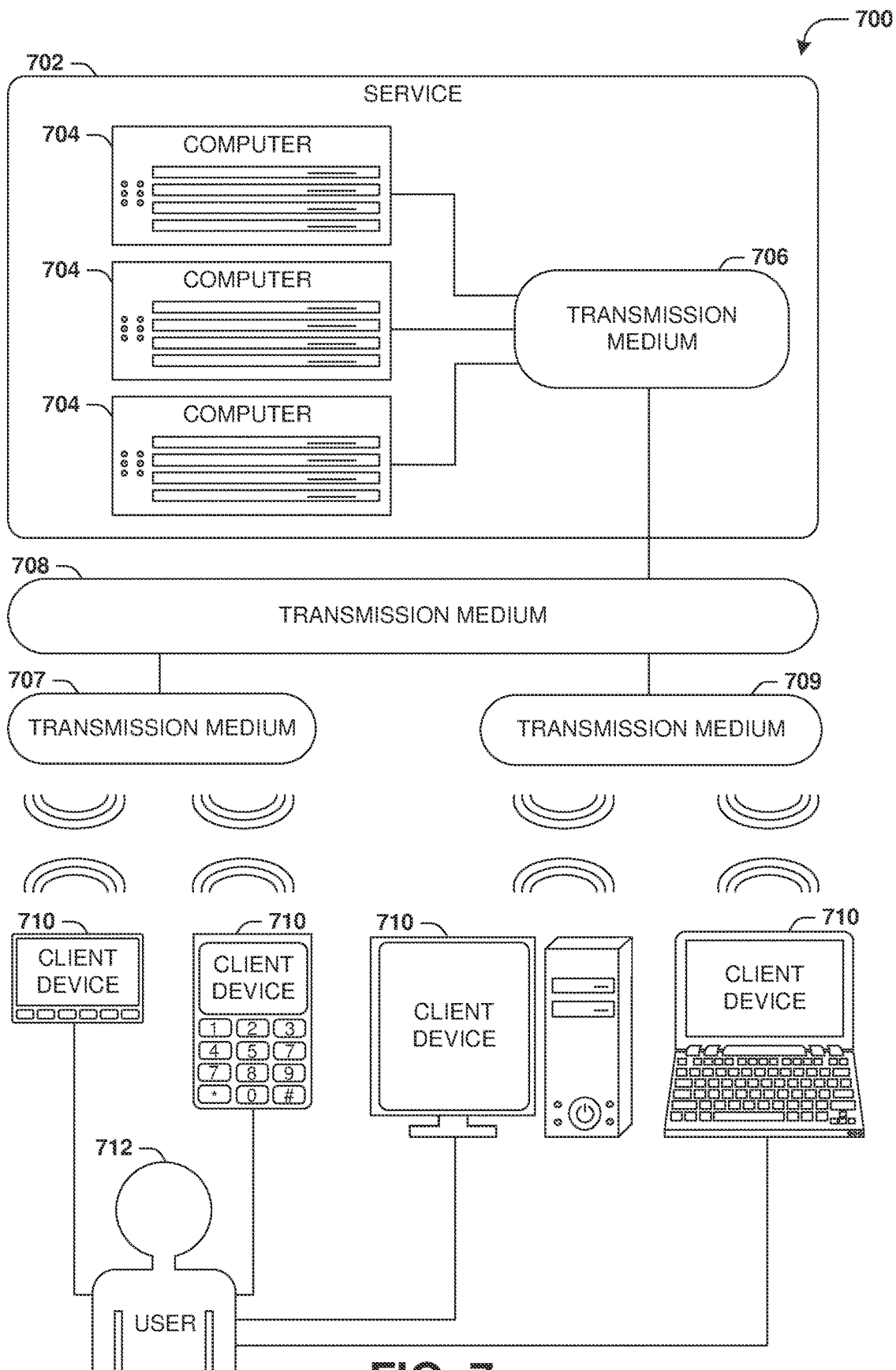
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a Wi-Fi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figure 8:
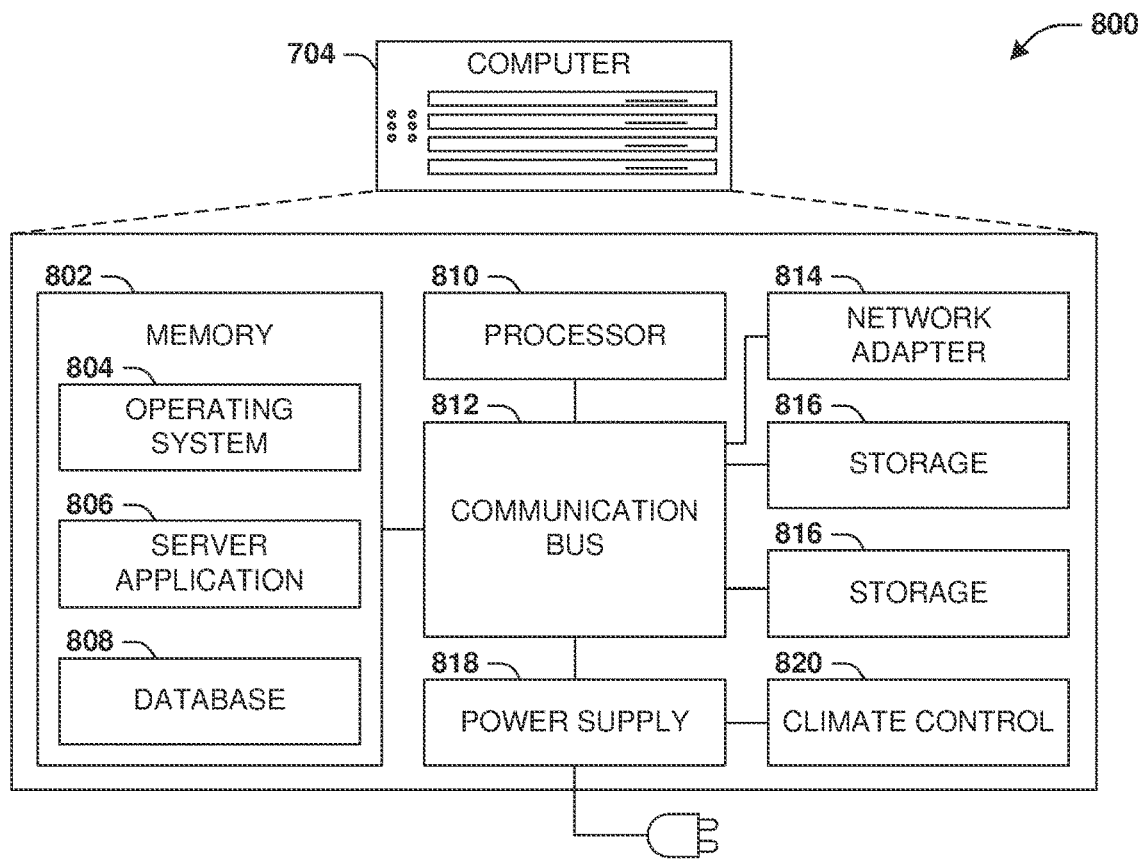
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

Figure 9:
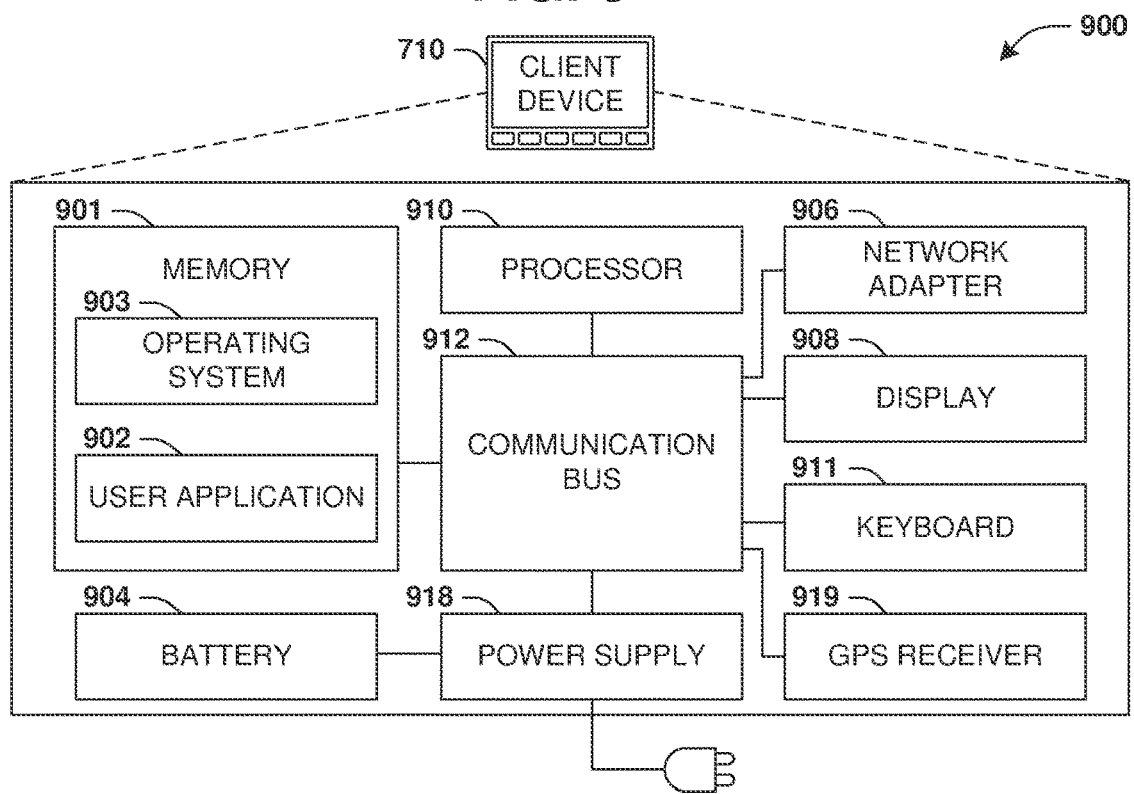
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

Figure 10:
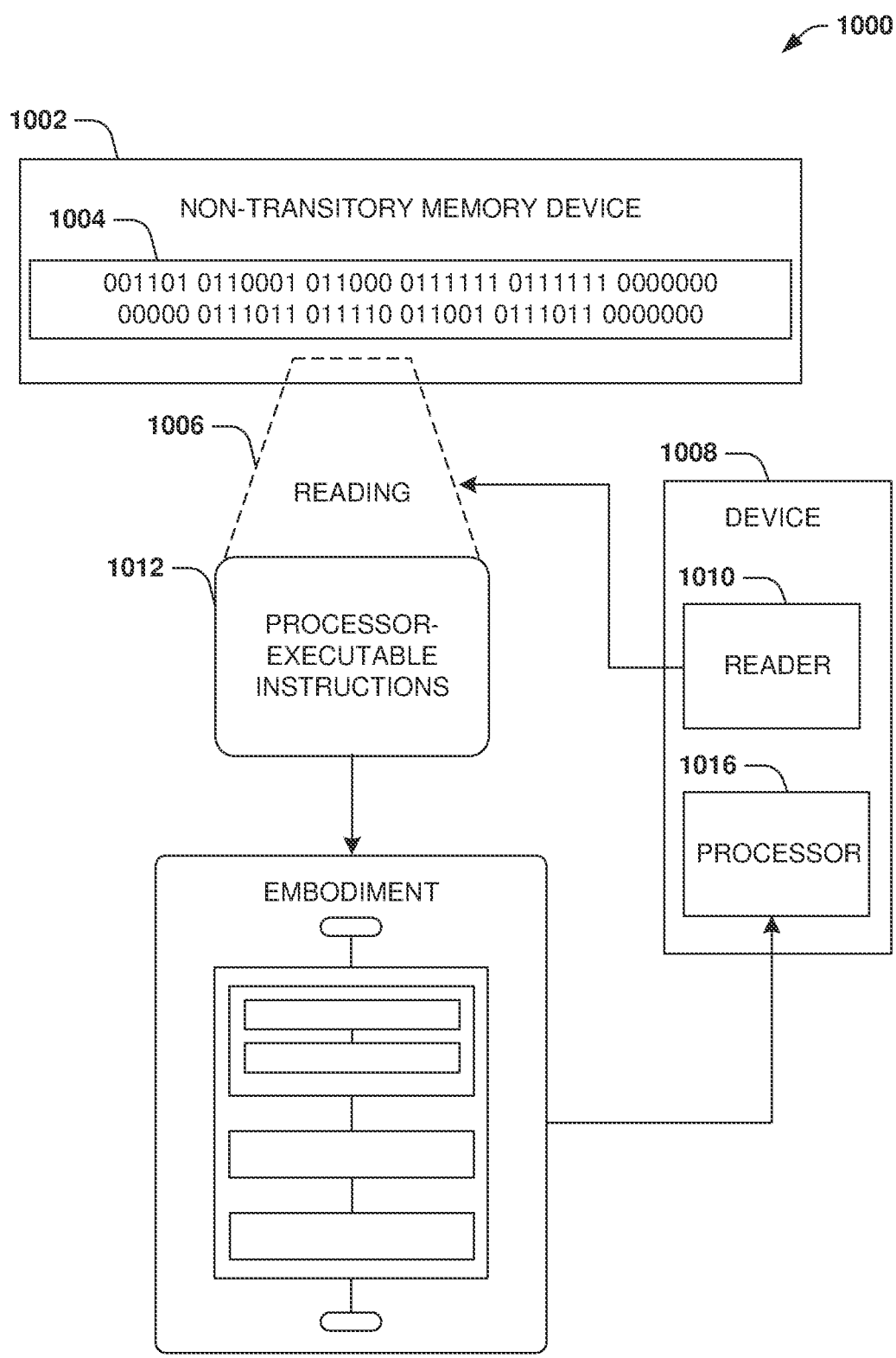
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 100 of FIG. 1 and/or at least some of the example method 300 of FIG. 3, for example. In some embodiments, the processor-executable instructions 1012 are configured to cause implementation of a system, such as at least some of the example system 400 of FIG. 4 and/or at least some of the example system 600 of FIG. 6.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed:

1. A method, comprising:
   evaluating geo-spatial datasets to assign baseline classifications to a plurality of locations;
   evaluating location feed data to assign confidence scores to the baseline classifications based upon correlations between the location feed data and the baseline classifications;
   selecting a set of locations from the plurality of locations based upon the set of locations having baseline classifications with confidence scores greater than a threshold;
   evaluating sub-locations at the set of locations to determine whether to override one or more baseline classifications, wherein a first baseline classification assigned to a first location is overridden with a second baseline classification in response to an override criteria being satisfied based upon a number of sub-locations at the first location having the second baseline classification;
   utilizing a model to evaluate images of the set of locations to generate predicted classifications for the set of locations;
   assigning classifications to the set of locations by implementing one or more conflict resolution rules to selectively retain or replace baseline classifications with predicted classifications; and
   constructing and implementing a network management plan to deploy equipment to one or more locations within the set of locations based upon classifications assigned to the one or more locations.

2. The method of claim 1, wherein the evaluating geo-spatial datasets comprises:
   in response to determining that a location does not have a baseline classification specified by the geo-spatial datasets, combining geo-spatial information for sub-locations associated with an address of the location; and
   evaluating the combined geo-spatial information to determine and assign a baseline classification to the location.

3. The method of claim 1, wherein the constructing and implementing the network management plan comprises:
   in response to a location being assigned a commercial classification, selecting and deploying a first type of equipment to the first location; and
   in response to a second location being assigned a residential classification, selecting and deploying a second type of equipment to the second location.

4. The method of claim 1, comprising:
   in response to identifying a conflict between a baseline classification for a location and a predicted classification generated by the model for the location, applying the one or more conflict resolution rules to resolve the conflict by selecting either the baseline classification or the predicted classification as a classification for the location.

5. The method of claim 1, wherein implementing a conflict resolution rule comprises:
   in response to more than one of the geo-spatial datasets specifying a baseline classification for a location and a determination that a business type of a business located at the location is known, assigning a first rating to a classification for the location, wherein the first rating is used to determine whether to deploy equipment to the location.

6. The method of claim 5, wherein implementing a conflict resolution rule comprises:
   in response to more than one of the geo-spatial datasets specifying the baseline classification for the location and a determination that a customer is located at the location, assigning a second rating to the classification, wherein the second rating is higher than the first rating, and wherein the second rating is used to determine whether to deploy equipment to the location.

7. The method of claim 1, comprising:
   in response to a determination that a predicted classification output by the model for a location matches a baseline classification for the location, increasing a rating assigned to a classification of the location, wherein the rating is used to determine whether to deploy equipment to the location.

8. The method of claim 1, comprising:
   in response to identifying a conflict between a baseline classification for a location and a predicted classification generated by the model for the location, utilize the model to identify a building at the location;
   evaluating the building to determine a classification for the location; and
   assigning a rating to the classification for determining whether to deploy equipment to the location.

9. The method of claim 1, comprising:
   adjusting a rating assigned to a classification for a location based upon a correlation between a text tag parsed from an image of the location by the model and a name of a business at the location, wherein the rating is used to determine whether to deploy equipment to the location, and wherein the rating is adjusted by a first value if the business is a prospective business and the rating is adjusted by a second value if the business is a customer.

10. The method of claim 1, wherein the model is utilized to generate attributes including:
    a sub-classification relating to at least one of a stadium, a medical facility, a manufacturing facility, a single family home, a condo, an industrial site, an airport, a distribution center, an indoor retail location, an outdoor retail location, or a building type;
    2-dimensional building polygons of a building;
    a number of stores or residential units in the building;
    a shape of the building; and
    text tags parsed from an image of the building.

11. The method of claim 1, comprising:
    utilizing the model to score shapes and perpendicular aspects of a building for assigning a rating used to determine whether to deploy equipment to a location where the building is located.

12. The method of claim 1, comprising:
    utilizing the model to determine whether to group terrain and one or more buildings of a location for generating a predicted classification for the location.

13. The method of claim 1, comprising:
    utilizing the model to determine a building type of a building at a location based upon text tags parsed from an image of the building.

14. A computing device comprising:
    a memory comprising instructions; and
    a processor coupled to the memory, the processor configured to execute the instructions to facilitate performance of operations comprising:

evaluating geo-spatial datasets to assign baseline classifications to a set of locations;

evaluating sub-locations at the set of locations to determine whether to override one or more baseline classifications, wherein a first baseline classification assigned to a first location is overridden with a second baseline classification in response to an override criteria being satisfied based upon a number of sub-locations at the first location having the second baseline classification;

utilizing a model to evaluate images of the set of locations to generate predicted classifications for the set of locations;

assigning classifications to the set of locations by implementing one or more conflict resolution rules to selectively retain or replace baseline classifications with predicted classifications; and deploying equipment to a location within the set of locations based upon a classification assigned to the location.

15. The computing device of claim 14, wherein the operations comprise:

utilizing the model to break down an image of the location into pictures around a building to identify structures used to assign the classification to the location.

16. The computing device of claim 14, wherein the operations comprise:

identifying an entity located within a building at the location; and selecting the equipment to deploy to the location based upon the entity.

17. The computing device of claim 14, wherein the operations comprise:

implementing a feedback loop based upon whether the classification is correct, wherein the feedback loop is utilized to update the model.

18. A non-transitory computer-readable medium storing instructions that when executed facilitate performance of operations comprising:

evaluating geo-spatial datasets to assign baseline classifications to a set of locations;

evaluating sub-locations at the set of locations to determine whether to override one or more baseline classifications, wherein a first baseline classification assigned to a first location is overridden with a second baseline classification in response to an override criteria being satisfied based upon a number of sub-locations at the first location having the second baseline classification;

utilizing a model to evaluate images of the set of locations to generate predicted classifications for the set of locations;

assigning classifications to the set of locations by implementing one or more conflict resolution rules to selectively retain or replace baseline classifications with predicted classifications;

identifying an entity associated with one or more locations; and generating a network management plan for the entity based upon classifications assigned to the one or more locations and the entity.

19. The non-transitory computer-readable medium of claim 18, wherein the operations comprise:

grouping buildings within a location into a group associated with the entity.

20. The non-transitory computer-readable medium of claim 18, wherein the operations comprise:

assigning property identifiers to the sub-locations, wherein a property identifier of the first location is assigned to sub-locations at the first location; and using the property identifier to identify and track the first location and the sub-locations at the first location.

* * * * *